United States Patent
Hirota et al.

(10) Patent No.: US 6,694,760 B2
(45) Date of Patent: Feb. 24, 2004

(54) REFRIGERATING CYCLE

(75) Inventors: Hisatoshi Hirota, Tokyo (JP); Tokumi Tsugawa, Tokyo (JP)

(73) Assignee: TGK Co. Ltd. (JP)

( * ) Notice: Subject to any disclaimer, the term of this patent is extended or adjusted under 35 U.S.C. 154(b) by 0 days.

(21) Appl. No.: 10/160,683

(22) Filed: Jun. 1, 2002

(65) Prior Publication Data

US 2002/0194864 A1 Dec. 26, 2002

(30) Foreign Application Priority Data

Jun. 7, 2001 (JP) ..................................... 2001-172505

(51) Int. Cl.[7] ........................... F25D 17/00; F25B 41/06
(52) U.S. Cl. ............................ 62/181; 62/527; 62/178
(58) Field of Search ...................... 62/498, 181, 527, 62/528, 178

(56) References Cited

U.S. PATENT DOCUMENTS

| | | | | |
|---|---|---|---|---|
| 3,150,498 A | * | 9/1964 | Blake | 62/81 |
| 4,324,112 A | * | 4/1982 | Fujiwara et al. | 62/511 |
| 5,768,902 A | * | 6/1998 | Nonaka et al. | 62/183 |
| 6,125,643 A | * | 10/2000 | Noda et al. | 62/196.4 |

* cited by examiner

Primary Examiner—Chen Wen Jiang
(74) Attorney, Agent, or Firm—Patterson, Thuente, Skaar & Christensen, P.A.

(57) ABSTRACT

A refrigerating cycle is capable of performing both an operation in which the maximum cooling power is desired to be unleashed and an operation in which the most excellent performance coefficient is attained.

A refrigerating cycle is configured such that a differential pressure-regulating valve forming a pressure-reducing device is arranged between a condenser and a receiver. As a result, by setting the differential pressure regulated by the differential pressure-regulating valve 3 to 0, it is possible to cause the refrigerating cycle to perform an operation in which the maximum cooling power is desired to be unleashed, whereas by setting the same to a desired value, it is possible to cause the same to perform an operation in which an excellent performance coefficient is attained. By forming the differential pressure-regulating valve by an electromagnetic differential pressure-regulating valve, the regulated differential pressure can be changed from approximately 0 to a desired value by an electric signal from the outside.

4 Claims, 7 Drawing Sheets

REFRIGERATING CYCLE

BACKGROUND OF THE INVENTION (1) Field of the Invention

This invention relates to a refrigerating cycle, and more particularly to a refrigerating cycle which can be used in an automotive air conditioner in a manner selectively performing an operation in which the maximum cooling power is desired to be unleashed and an operation in which the most excellent coefficient of performance is attained.

(2) Description of the Related Art

An automotive air conditioner is operated under adverse service conditions. For instance, it has a compressor thereof driven by an engine whose rotational speed is largely changed. Therefore, a refrigerating cycle for the automotive air conditioner is configured to be properly serviceable even under such conditions. A generally known type of the refrigerating cycle for the automotive air conditioner uses a receiver and a thermal expansion valve.

This type of refrigerating cycle is so configured as to adiabatically compress a gaseous refrigerant with a compressor driven by the engine, condense the gaseous refrigerant compressed to a high temperature and a high pressure with a condenser, separate the condensed refrigerant into a gaseous refrigerant and a liquid refrigerant with a receiver, adiabatically expand the separated liquid refrigerant with a thermal expansion valve to thereby produce a low-temperature and low-pressure refrigerant and allow this refrigerant to be evaporated with an evaporator and then return to the compressor.

The conventional refrigerating cycle is somewhat configured to allow the maximum cooling power thereof to be unleashed when the compressor is driven by a constant rotational speed. Although the operation of the cycle providing the maximum cooling power is necessary under limited conditions, e.g. when the automotive air conditioner is started, it is preferable from the view point of energy saving that the cycle operates to provide a required refrigerating capability by a minimum power, i.e. with an excellent coefficient of performance, e.g. when it is in a steady operating condition.

SUMMARY OF THE INVENTION

The present invention has been made in view of the above circumstances, and an object thereof is to provide a refrigerating cycle which is capable of performing both an operation in which the maximum cooling power thereof is desired to be unleashed and an operation in which the most excellent coefficient of performance is attained.

In order to accomplish the object, the present invention provides a refrigerating cycle including a compressor, a condenser, a receiver, an expansion device, and an evaporator, which are connected by a conduit line in the mentioned order, characterized in that a pressure-reducing device is arranged between said condenser and said receiver.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will now be described in detail with reference to the drawings.

Figure 1:
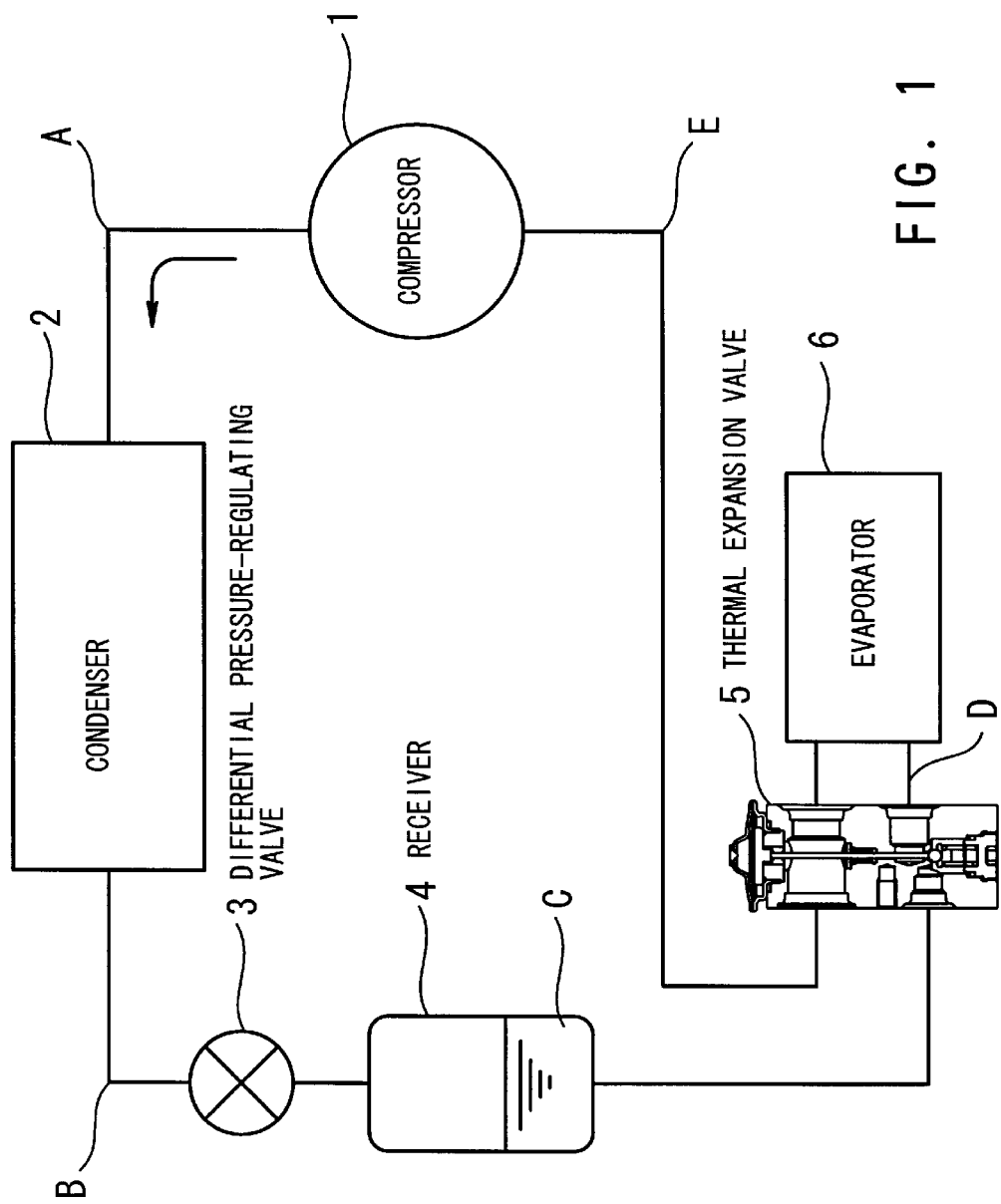
FIG. 1 Diagram showing the arrangement of a refrigerating cycle according to the invention.
Figure 2:
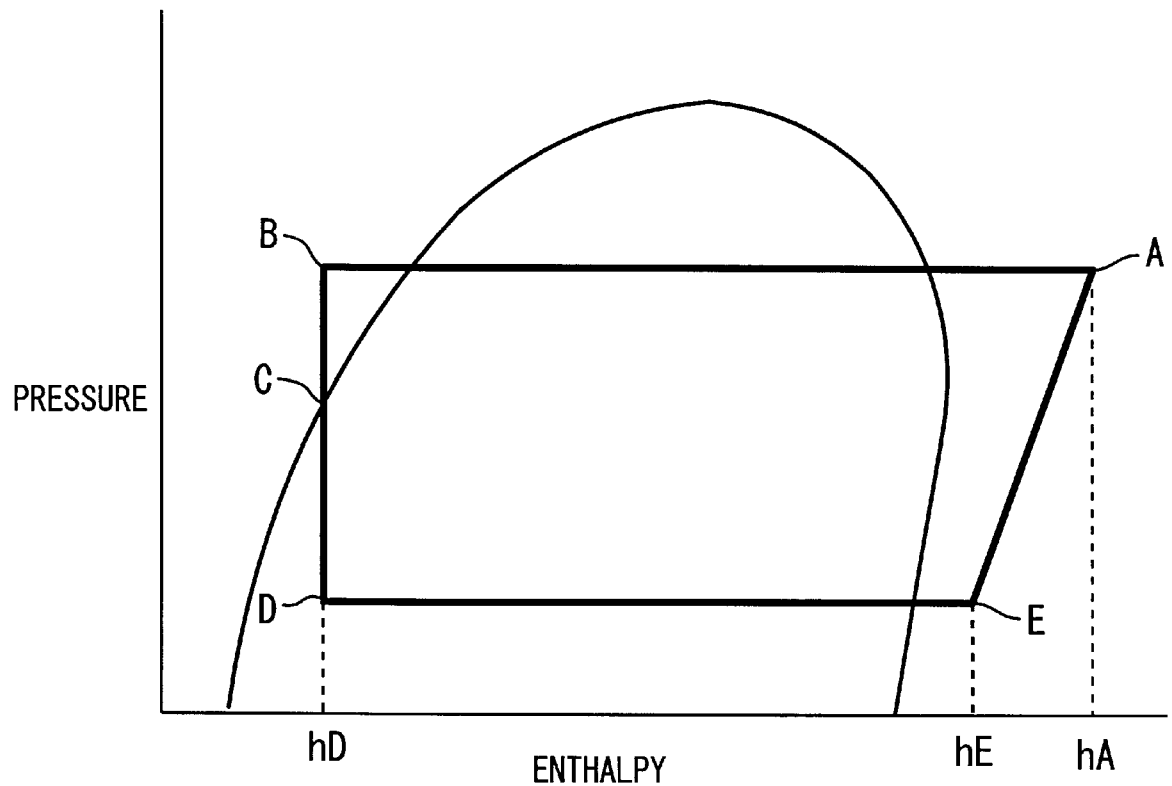
FIG. 2 Mollier chart useful in explaining the operation of the refrigerating cycle according to the invention.

FIG. 1 is a block diagram showing the arrangement of a refrigerating cycle according to the invention. FIG. 2 shows a Mollier chart which is useful in explaining the operation of the refrigerating cycle according to the invention.

The refrigerating cycle according to the invention includes a compressor 1 which is driven for rotation by an engine and has a discharge port thereof connected to a condenser 2. The condenser 2 has an outlet thereof connected to a receiver 4 for carrying out gas/liquid separation, via a differential pressure-regulating valve 3 which is the pressure-reducing device. The receiver 4 has a liquid outlet thereof connected to a high-pressure refrigerant inlet of a thermal expansion valve 5 which is the expansion device. The thermal expansion valve 5 has a low-pressure refrigerant outlet thereof connected to a evaporator 6. The evaporator 6 has an outlet thereof connected to a suction port of the compressor 1 via a passage of the thermal expansion valve 5 which senses the temperature of refrigerant flowing from the outlet of the evaporator 6.

Now, the operation of the refrigerating cycle configured as above will be described with reference to FIG. 2. In the figure, the ordinate represents pressure, which the abscissa represents enthalpy.

The compressor 1 compresses a gaseous refrigerant to increase the pressure thereof up to point A. The refrigerant thus caused to have a high temperature and a high pressure is then cooled by the condenser 2 to be thereby brought to the state of point B. Next, the cooled refrigerant passes through the differential pressure-regulating valve 3, whereby the pressure thereof is reduced by a predetermined differential pressure. Thereafter, the refrigerant enters the receiver 4 to be thereby brought to the state of point C. At this time, point C is on a saturated liquid curve. A liquid refrigerant obtained by gas/liquid separation by the receiver 4 is then guided into the thermal expansion valve 5, where it is adiabatically expanded to be brought to the state of point D. The refrigerant turned into a low-temperature and low-pressure condition by the adiabatic expansion is evaporated by the evaporator 6 to be brought to the state of point E. At this time, the thermal expansion valve 5 senses the temperature and pressure of the refrigerant flowing out from the evaporator 6, and controls the flow rate of the refrigerant such that the status of the refrigerant crosses over the saturated liquid curve to have a predetermined degree of superheat. The refrigerant having a controlled degree of superheat enters the compressor 1, where the refrigerant is increased in pressure to perform transition from the state of point E to the state of point A.

The differential pressure-regulating valve 3 controls the pressure of the refrigerant such that the differential pressure between the points B and C is constant. This differential pressure can be changed from approximately 0 to a desired value by an electric signal from the outside. Further, the liquid refrigerant collected in the receiver 4 is in the state of point C, and point C is moved along the saturated liquid curve when the differential pressure regulated by the differential pressure-regulating valve 3 is changed. More specifically, by changing the differential pressure regulated by the differential pressure-regulating valve 3, point C is moved upward or downward along the saturated liquid curve, and point D is moved in a left-right direction in the figure, so that it is possible to change the enthalpy difference across the evaporator 6.

Now, if the maximum cooling power of the refrigerating cycle is desired to be unleashed, as in a case of operation with a very high load on the refrigerating cycle, the differential pressure regulated by the differential pressure-regulating valve 3 is set to approximately 0. This establishes the state of point C=point B, so that refrigerant at the outlet of the condenser 2 is controlled to a state where condensation thereof has just been completed without being supercooled. This refrigerant is supplied to the thermal expansion valve 5 via the receiver 4. The refrigerant is thus controlled to the optimum state at the outlet of the condenser 2, which makes it possible to unleash the maximum cooling power of the refrigerating cycle.

On the other hand, when the automotive air conditioner is in a stable operating condition after the temperature within the compartment has been controlled to be close to a preset temperature and hence the load on the refrigerating cycle has become small, the differential pressure regulated by the differential pressure-regulating valve 3 is set to a value larger than 0. This expands the enthalpy difference (hE−hD) across the evaporator 6 to increase the performance coefficient COP of the refrigerating cycle. More specifically, the coefficient of the performance COP is represented by:

$$COP=(hE-hD)/(hA-hE) \qquad [\text{Math. 1}]$$

The performance coefficient COP is improved as the numerator of the equation is increased. With the improvement of the performance coefficient, a required cooling power can be obtained by a smaller power. This reduces load on the engine by the automotive air conditioner, whereby energy saving operation can be expected.

Figure 3:
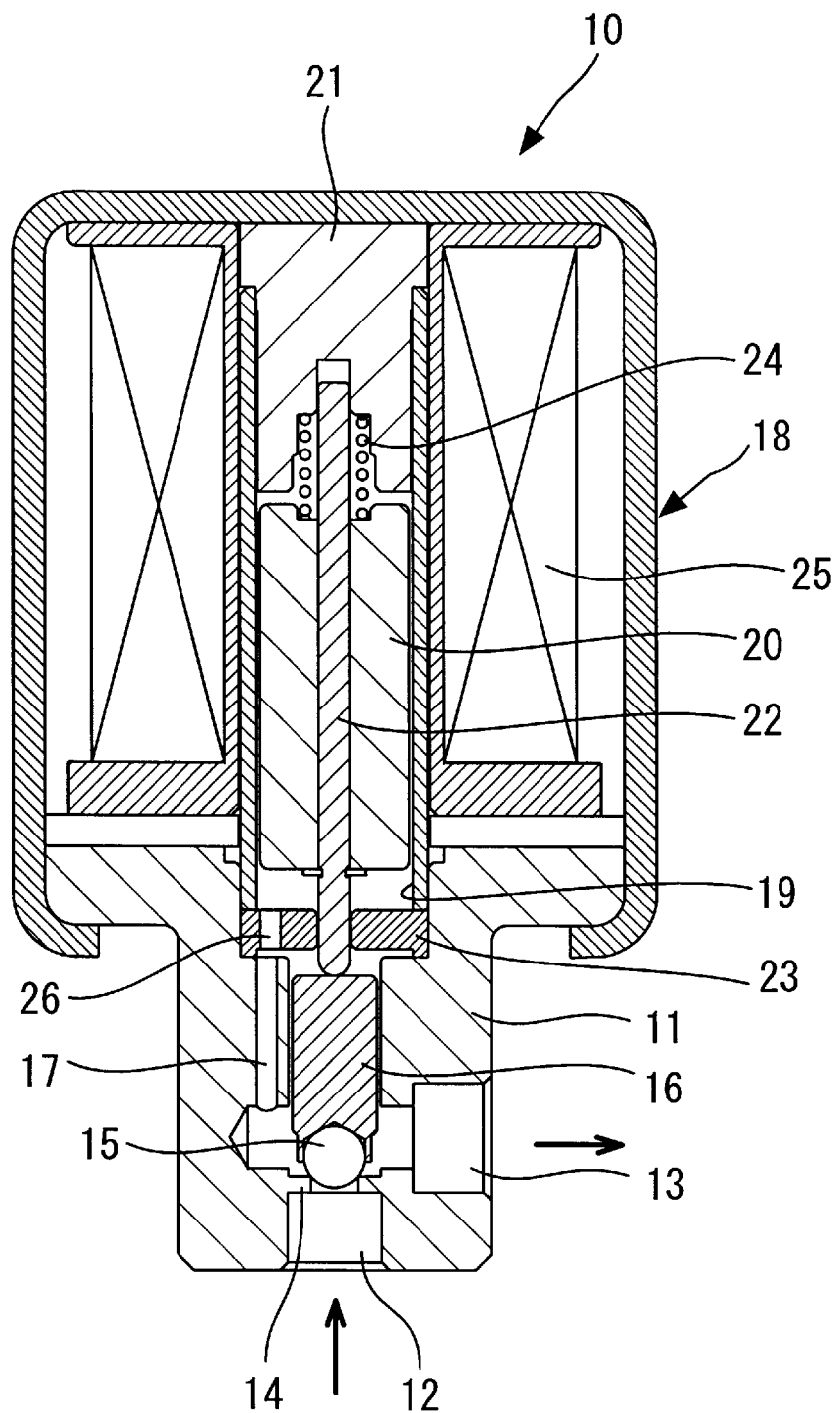
FIG. 3 Cross-sectional view of a first example of the construction of a differential pressure-regulating valve.
Figure 4:
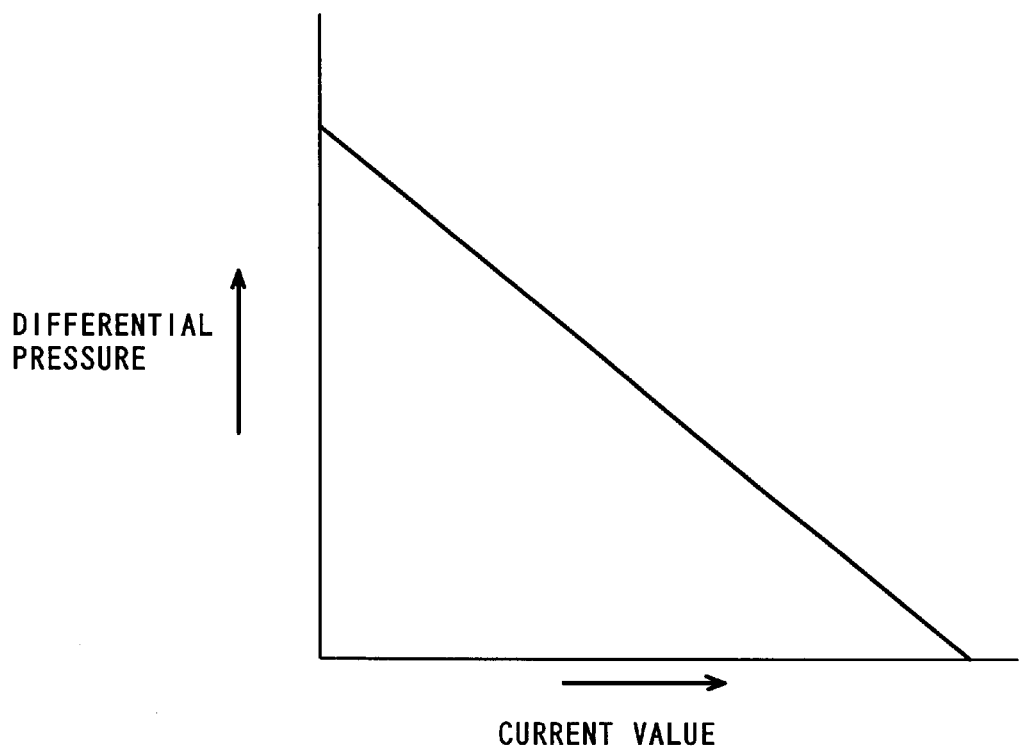
FIG. 4 Characteristics diagram showing changes in the differential pressure relative to the value of a solenoid current of the differential pressure-regulating valve shown in FIG. 3.

FIG. 3 is a cross-sectional view showing a first example of the construction of the differential pressure-regulating valve. FIG. 4 is a characteristics diagram showing changes in the differential pressure, relative to the value of a solenoid current of differential pressure-regulating valve shown in FIG. 3.

The differential pressure-regulating valve 10 is comprised of a body 11 including an inlet hole 12 and an outlet hole 13, a valve seat 14 integrally formed with the body 11 at an intermediate portion of a refrigerant passage communicating between the inlet hole 12 and the outlet hole 13, and a valve element 15 arranged in a manner opposed to the valve seat 14 from a downstream side. The valve element 15 is retained by a valve-urging member 16 to prevent the valve element 15 from being rolled by the refrigerant when the flow rate of the refrigerant through the opening of the valve seat 14 is high. The valve-urging member 16 in the form of a piston is inserted into a cylinder formed within the body 11 in a manner movable along the axis of the cylinder. In the vicinity of the cylinder accommodating the valve-urging member 16 is bored a communication hole 17 for ensuring uniform pressure in all downstream portions of the differential pressure-regulating valve 10.

The valve-urging member 16 is driven by a solenoid 18 arranged on the body 11. The solenoid 18 includes a sleeve 19 in which a movable core 20 is arranged in an axially movable manner. The sleeve 19 has a fixed core 21 fixedly arranged on an upper end thereof such that the fixed core 21 blocks the opening of the upper end. A shaft 22, which is arranged along the axis of the movable core 20, extends through the movable core 20. The shaft 22 has a valve side thereof supported by a bearing 23, and an upper end thereof supported by a recessed portion formed in the fixed core 21. Between the movable core 20 and the fixed core 21, there is arranged a spring 24 for urging the valve element 15 in the valve-closing direction. A magnetic coil 25 is arranged outside the sleeve 19. Further, the bearing 23 as well has a communication hole 26 formed therethrough for ensuring uniform pressure in all downstream portions of the differential pressure-regulating valve 10.

In the differential pressure-regulating valve 10, first, when the magnetic coil 25 is not energized and no refrigerant is introduced into the inlet hole 12, the valve element 15 is seated on the valve seat 14 by the spring 24 to close the differential pressure-regulating valve 10, as shown in FIG. 3.

Here, when refrigerant having a certain pressure is introduced from the condenser 2 into the inlet hole 12 of the differential pressure-regulating valve 10, the pressure urges the valve element 15 in the valve-opening direction. The valve element 15 is stopped at a position corresponding to a degree of opening of the differential pressure-regulating valve 10 where the pressure of the refrigerant is balanced with the load of the spring 24 within the solenoid 18, thereby generating a predetermined differential pressure between the inlet hole 12 and the outlet hole 13.

Next, when the magnetic coil 25 is energized, the movable core 20 is attracted to the fixed core 21, and the spring force of the spring 24 which is urging the valve element 15 is decreased, whereby the differential pressure regulated by the differential pressure-regulating valve 10 is reduced. When the value of a current energizing the magnetic coil 25 is increased, a force for attracting the movable core 20 to the fixed core 21 is increased, whereby it is possible to further decrease the differential pressure regulated by the valve 10.

As described above, when the value of the current energizing the magnetic coil 25 is 0, as shown in FIG. 4, the differential pressure-regulating valve 10 is set to the maximum differential pressure, and as the value of the energizing current is increased, the regulated differential pressure is reduced until it becomes approximately equal to 0.

Therefore, when the refrigerating cycle is started, or when refrigeration load on the refrigerating cycle is high due to a very high outdoor temperature, the value of the energizing current is maximized to make the differential pressure regulated by the differential pressure-regulating valve 10 approximately equal to 0, thereby allowing the maximum cooling power of the refrigerating cycle to be unleashed. Inversely, when the refrigeration load is low, the regulated differential pressure is adjusted such that the performance coefficient is increased.

Figure 5:
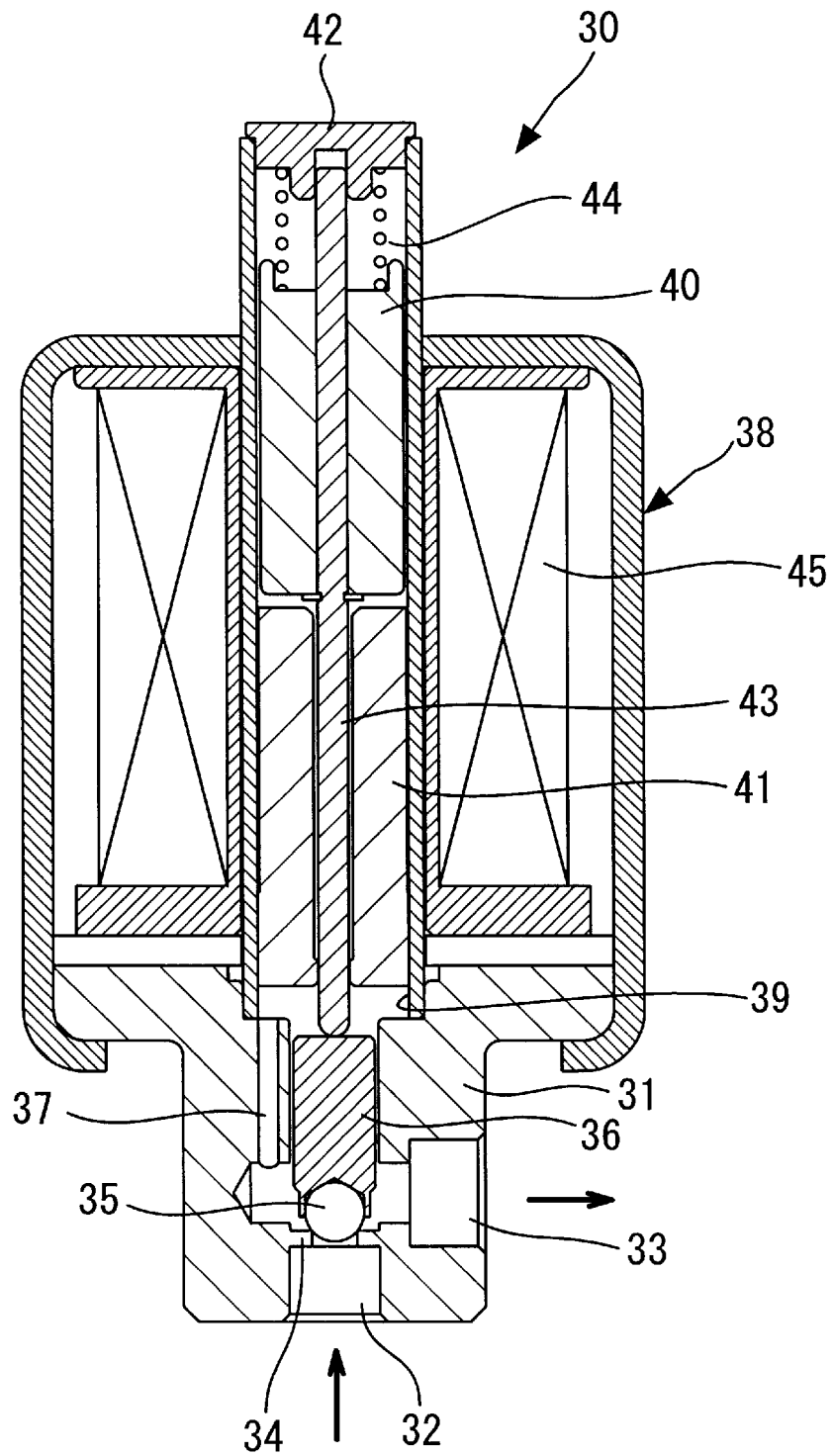
FIG. 5 Cross-sectional view of a second example of the construction of the differential pressure-regulating valve.
Figure 6:
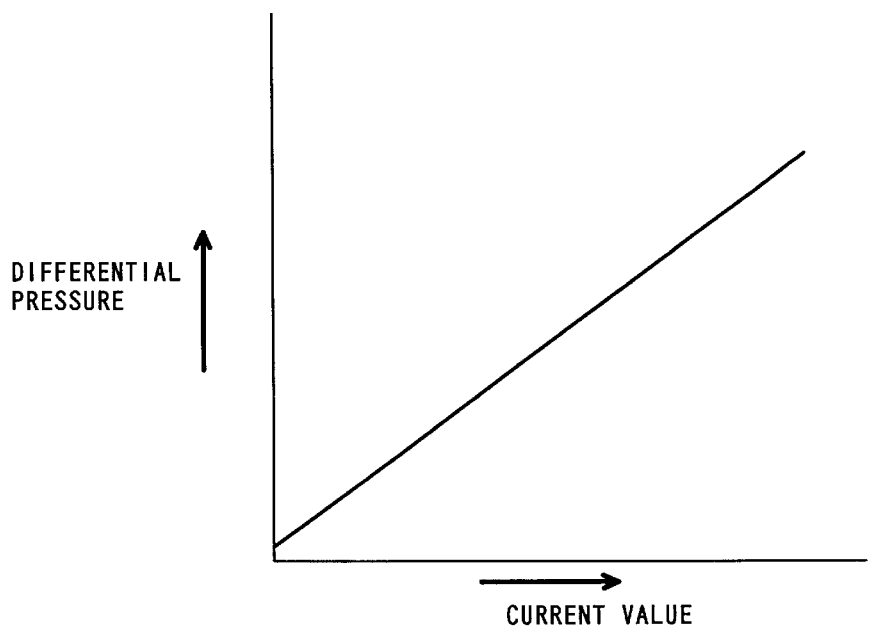
FIG. 6 Characteristics diagram showing changes in the differential pressure relative to the value of a solenoid current of the differential pressure-regulating valve shown in FIG. 5; and, FIG. 7 Diagram showing an example of the construction of another refrigerating cycle.

FIG. 5 is a cross-sectional view showing a second example of the construction of the differential pressure-regulating valve. FIG. 6 is a characteristics diagram showing changes in the differential pressure of differential pressure-regulating valve, relative to the value of a solenoid current shown in FIG. 5.

The differential pressure-regulating valve 30 is comprised of a body 31 including an inlet hole 32 and an outlet hole 33, a valve seat 34 integrally formed with the body 31 at an intermediate portion of a refrigerant passage communicating between the inlet hole 32 and the outlet hole 33, and a valve element 35 arranged in a manner opposed to the valve seat 34 from a downstream side. The valve element 35 is retained by a valve-urging member 36. The valve-urging member 36 in the form of a piston is inserted into a cylinder formed within the body 31 in a manner movable along the axis of the cylinder. In the vicinity of the cylinder accommodating the valve-urging member 36 is bored a communication hole 37.

The valve-urging member 36 is driven by a solenoid 38 arranged on the body 31. The solenoid 38 includes a sleeve 39 in which a movable core 40 is arranged in an axially movable manner. The sleeve 39 has a fixed core 41 fixedly arranged on a lower end side thereof. The sleeve 39 has a cap 42 rigidly fixed to an upper end thereof such that the cap 42 blocks the opening of the upper end. A shaft 43, which is arranged along the axis of the movable core 40, extends through the movable core 40. The shaft 43 has a valve side thereof supported by a bearing portion which is formed at an end of the fixed core 41 toward the valve element, and an upper end thereof supported by a bearing portion formed as a recess in the cap 42. Between the movable core 40 and the cap 42, there is arranged a spring 44 having a small spring load for urging the valve element 35 in the valve-closing direction. A magnetic coil 45 is arranged outside the sleeve 39.

In the differential pressure-regulating valve 30 constructed as above, first, when the magnetic coil 45 is not energized and no refrigerant is introduced into the inlet hole 32, the valve element 35 is seated on the valve seat 34 by the spring 44 to close the differential pressure-regulating valve 30, as shown in FIG. 5.

Here, when refrigerant having a certain pressure is introduced from the condenser 2 into the inlet hole 32 of the differential pressure-regulating valve 30, the pressure urges the valve element 35 in the valve-opening direction to substantially fully open the valve 30. At this time, since the load of the spring 44 within the solenoid 38 is applied to the valve element 35 in the valve-closing direction, a small amount of differential pressure is produced across the valve 30. However, this differential pressure can be reduced to an extent in which the differential pressure is substantially negligible, by reducing the spring load of the spring 44.

Next, when the magnetic coil 45 is energized, the movable core 40 is attracted to the fixed core 41, and the shaft 43 rigidly fitted in the movable core 40 urges the valve-urging member 36 to move the valve element 35 in the valve-closing direction. This decreases the degree of opening of the differential pressure-regulating valve 30, thereby increasing the differential pressure regulated by the valve 30. When the value of a current energizing the magnetic coil 45 is increased, a force for attracting the movable core 40 to the fixed core 41 is increased, whereby it is possible to further increase the differential pressure regulated by the valve 30.

As described above, when the value of the current energizing the magnetic coil 45 is 0, as shown in FIG. 6, the differential pressure-regulating valve 30 is substantially set to a minimum differential pressure value of 0, and as the value of the energizing current is increased, the regulated differential pressure is increased.

Therefore, when the refrigeration load on the refrigerating cycle is high, the value of the energizing current is reduced to 0 to make the regulated differential pressure approximately equal to 0, thereby causing the maximum cooling power of the refrigerating cycle to be unleashed. Inversely, when the refrigeration load is low, the value of the energizing current is adjusted to set an appropriate differential pressure such that the performance coefficient is increased.

Figure 7:
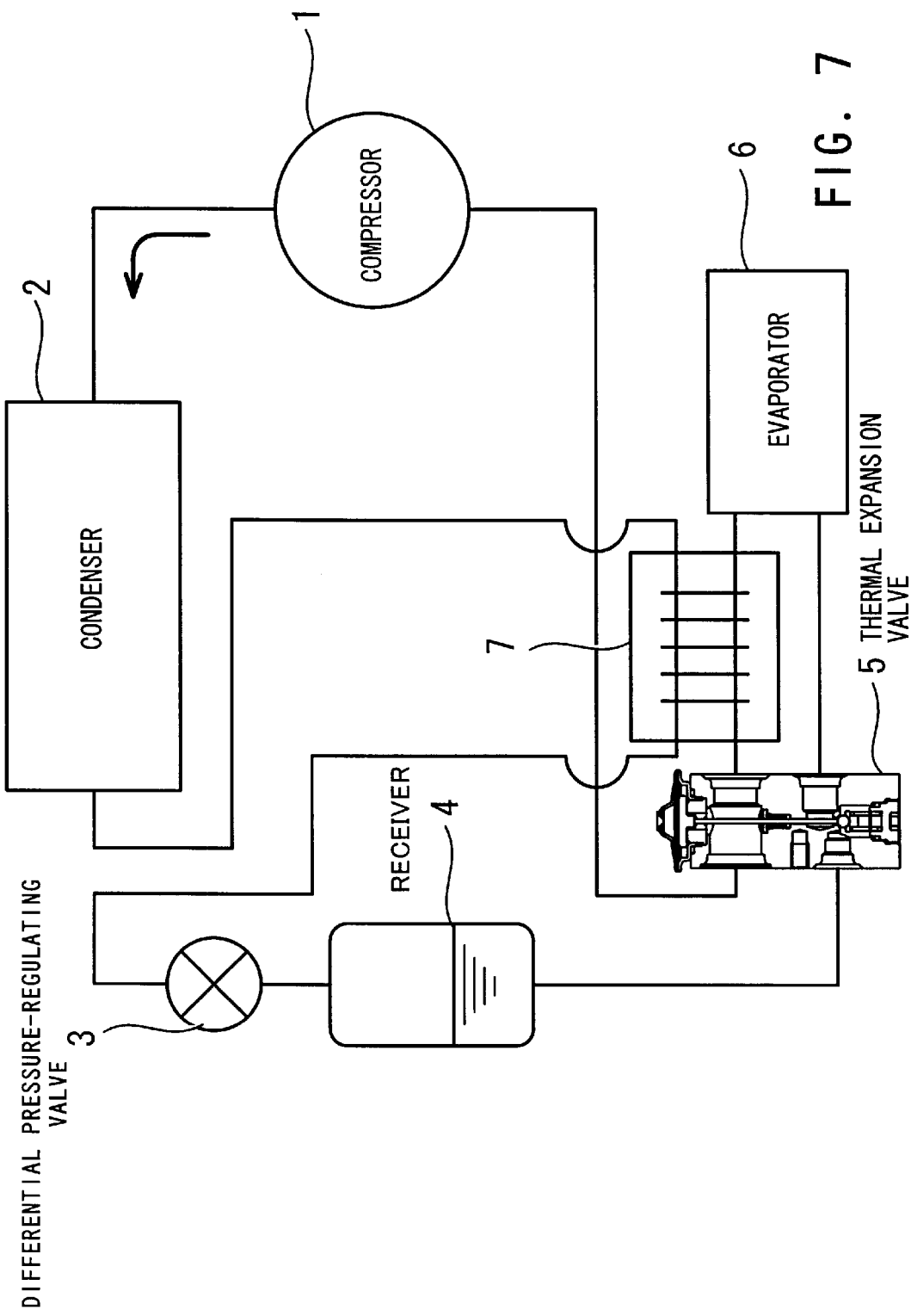

FIG. 7 is a diagram showing an example of the construction of another refrigerating cycle. In FIG. 7, component parts and elements similar to those appearing in FIG. 1 are designated by identical reference numerals, and detailed description thereof is omitted.

This refrigerating cycle includes an internal heat exchanger 7 which causes heat to be exchanged between refrigerant flowing from the condenser 2 to the differential pressure-regulating valve 3, and refrigerant flowing from the evaporator 6 to the thermal expansion valve 5.

As a result, the refrigerant flowing from the condenser 2 to the differential pressure-regulating valve 3 is cooled by the refrigerant flowing from the evaporator 6 to the thermal expansion valve 5, while the refrigerant flowing from the evaporator 6 to the thermal expansion valve 5 is heated by the refrigerant flowing from the condenser 2 to the differential pressure-regulating valve 3, whereby it is possible to enhance the refrigerating capability of the refrigerating cycle.

As described heretofore, the refrigerating cycle according to the invention is configured such that the pressure-reducing device is arranged between the condenser and the receiver. As a result, by setting the pressure reduction by the pressure-reducing device to 0, it is possible to cause the cycle to perform the operation in which the maximum cooling power is desired to be unleashed, whereas by setting the pressure reduction to a desired value, it is possible to cause the cycle to perform the operation in which an excellent performance coefficient is attained. This makes it possible to perform both the operation with the maximum cooling power and the operation with an excellent performance coefficient.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A refrigerating cycle including a compressor, a condenser, a receiver, an expansion device, and an evaporator, which are connected by a conduit line in the mentioned order,
    characterized in that a differential pressure-regulating valve is arranged between said condenser and said receiver,
        wherein said differential pressure-regulating valve is an electromagnetic differential pressure-regulating valve having a refrigerant inlet and a refrigerant outlet and which is capable of changing a differential pressure generated between the refrigerant inlet and the refrigerant outlet from approximately 0 to a desired value by an electric signal from an outside source.

2. The refrigerating cycle according to claim 1, wherein said expansion device is a thermal expansion valve which controls the degree of superheat of a refrigerant flowing out from said evaporator.

3. The refrigerating cycle according to claim 1 wherein the electric signal from an outside source is a current signal.

4. The refrigerating cycle according to claim 3 wherein a linear relationship exists between the differential pressure generated and the current signal.

* * * * *

UNITED STATES PATENT AND TRADEMARK OFFICE
CERTIFICATE OF CORRECTION

PATENT NO. : 6,694,760 B2 Page 1 of 1
DATED : February 24, 2004
INVENTOR(S) : Hirota et al.

It is certified that error appears in the above-identified patent and that said Letters Patent is hereby corrected as shown below:

<u>Title page,</u>
Item [73], Assignee, after "Co." insert -- , --.

Signed and Sealed this

Twenty-second Day of June, 2004

JON W. DUDAS
*Acting Director of the United States Patent and Trademark Office*